United States Patent
Puttaswamy Naga et al.

(10) Patent No.: US 9,055,086 B2
(45) Date of Patent: Jun. 9, 2015

(54) SYSTEM AND METHOD FOR MANAGING DATA TRANSFER FROM A DATA CENTER INCLUDING BANDWIDTH LIMITS AND A FLEX PARAMETER INDICATING BANDWIDTH VARIATION BETWEEN DATA TRANSFER PERIODS

(75) Inventors: Krishna P. Puttaswamy Naga, Metuchen, NJ (US); Thyagarajan Nandagopal, Edison, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 397 days.

(21) Appl. No.: 13/338,636

(22) Filed: Dec. 28, 2011

(65) Prior Publication Data
US 2013/0174172 A1 Jul. 4, 2013

(51) Int. Cl.
G06F 9/455 (2006.01)
G06F 9/46 (2006.01)
H04L 29/08 (2006.01)
G06F 9/48 (2006.01)

(52) U.S. Cl.
CPC .......... H04L 67/1097 (2013.01); G06F 9/4881 (2013.01); G06F 2209/485 (2013.01); H04L 67/325 (2013.01)

(58) Field of Classification Search
None
See application file for complete search history.

(56) References Cited

U.S. PATENT DOCUMENTS

| 6,940,861 B2* | 9/2005 | Liu et al. ............. 370/395.21 |
| 8,437,369 B2* | 5/2013 | Shaikli ............. 370/468 |
| 2008/0040724 A1* | 2/2008 | Kang et al. ............. 718/104 |
| 2008/0229322 A1* | 9/2008 | Berstis et al. ............. 718/106 |
| 2008/0271039 A1* | 10/2008 | Rolia et al. ............. 718/105 |
| 2008/0295096 A1* | 11/2008 | Beaty et al. ............. 718/1 |
| 2009/0199196 A1* | 8/2009 | Peracha ............. 718/104 |
| 2009/0222558 A1* | 9/2009 | Xu et al. ............. 709/224 |
| 2009/0288090 A1* | 11/2009 | Ujibashi et al. ............. 718/103 |
| 2011/0246995 A1* | 10/2011 | Fedorova et al. ............. 718/103 |
| 2013/0024426 A1* | 1/2013 | Flowers et al. ............. 707/654 |

OTHER PUBLICATIONS

"Oracle Fusion Middleware", Oct. 2009.*

* cited by examiner

*Primary Examiner* — Meng An
*Assistant Examiner* — Bradley Teets
(74) *Attorney, Agent, or Firm* — Carlson, Gaskey & Olds, P.C.

(57) ABSTRACT

An exemplary data transfer manager includes a datacenter configured to communicate over at least one link and a scheduler that is configured to schedule a plurality of jobs for communicating data from the datacenter. The scheduler determines a minimum bandwidth requirement of each job and determines a maximum bandwidth limit of each job. The scheduler determines a flex parameter of each job. The flex parameter indicates how much a data transfer rate can vary between adjacent data transfer periods for the job.

16 Claims, 2 Drawing Sheets

SYSTEM AND METHOD FOR MANAGING DATA TRANSFER FROM A DATA CENTER INCLUDING BANDWIDTH LIMITS AND A FLEX PARAMETER INDICATING BANDWIDTH VARIATION BETWEEN DATA TRANSFER PERIODS

BACKGROUND

Cloud service providers (CSPs) operate cloud computing infrastructure using multiple datacenters. High capacity links interconnect the datacenters. Most CSPs lease the links from network operators. Typical contractual arrangements require the CSP to pay for bandwidth consumed over the link. For example, the network operator charges the CSP by the value of the $95^{th}$ percentile value of the peak bandwidth consumed on the link. There are other known billing models. In each instance, however, the CSP incurs additional cost when there are higher peaks in bandwidth consumption.

Studies indicate that traffic on such high capacity links typically follows a diurnal pattern. The typical billing model under which a CSP pays for peak usage and the typical traffic pattern combine in a disadvantageous way for the CSPs. On the one hand, the CSPs are paying for peak usage. On the other hand, there are other times when a significant amount of bandwidth capacity is left unused.

It would be useful to improve the CSPs use of available capacity while minimizing cost. A solution to this problem, however, is not straightforward. One proposed solution includes scheduling bulk data jobs for off-peak times over the link between datacenters. This so-called water-filling technique typically includes the assumption that bulk data jobs are elastic and pre-emptible. It is typically assumed that bulk data jobs can be commanded to occupy any amount of bandwidth specified by the CSP. In reality, however, there is no practical example of an application that is truly elastic and truly pre-emptible, especially for datacenter traffic where bandwidths span several gigabits per second and the time scales are of the order of several minutes.

SUMMARY

An exemplary data transfer manager incldues a scheduler that is configured to schedule a plurality of jobs for communicating data from a datacenter that is configured to communicate over at least one link. The scheduler determines a minimum bandwidth requirement of each job and determines a maximum bandwidth limit of each job. The scheduler determines a flex parameter of each job. The flex parameter indicates how much a data transfer rate can vary between adjacent data transfer periods for the job.

An exemplary method of managing data transfer from a datacenter configured to communicate over at least one link includes determining a minimum bandwidth requirement of each job, determining a maximum bandwidth limit of each job, and determining a flex parameter of each job. The flex parameter indicates how much a data transfer rate can vary between adjacent data transfer periods for the job.

The various features and advantages of a disclosed example embodiment will become apparent to those skilled in the art from the following detailed description. The drawings that accompany the detailed description can be briefly described as follows.

DETAILED DESCRIPTION

Figure 1:
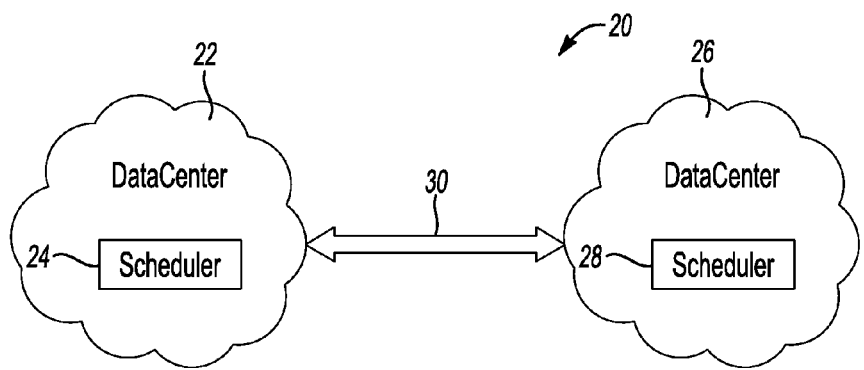
FIG. 1 schematically illustrates an example system that is configured according to an embodiment of this invention.

FIG. 1 schematically illustrates a cloud computing system 20. A first datacenter device 22 comprises one or more computing components, such as a computer, processor or memory. The first datacenter device 22 has an associated scheduler 24 that is configured to schedule data transfer jobs for the first datacenter device. The scheduler 24 comprises a physical computing device such as a processor in this example. In some examples, the scheduler 24 is part of the datacenter device 22 while in others it is embodied in separate components. A second datacenter device 26 resembles the first datacenter device 22. A scheduler 28 associated with the second datacenter device 26 is configured to schedule data transfer jobs for the second datacenter device 26.

The datacenter devices 22 and 26 communicate with each other over a high capacity link 30. The schedulers 24, 28 or the datacenter devices 22, 26 have a link interface that comprises one or more physical components for interfacing with and communicating over the link 30. In one example, the link 30 is provided by a network operator that charges the cloud service provider (CSP) that utilizes the datacenter devices 22 and 26. The network operator charges the CSP for use of the link 30 according to an amount of bandwidth used by the CSP.

A disclosed data transfer management technique used by the schedulers 24 and 28 attempts to minimize costs to the CSP by managing bandwidth consumption over the link 30. The data transfer management technique utilizes a set of parameters associated with each of the data transfer jobs for prioritizing scheduled jobs and to manage the amount of bandwidth consumed during such data transfer.

Figure 2:
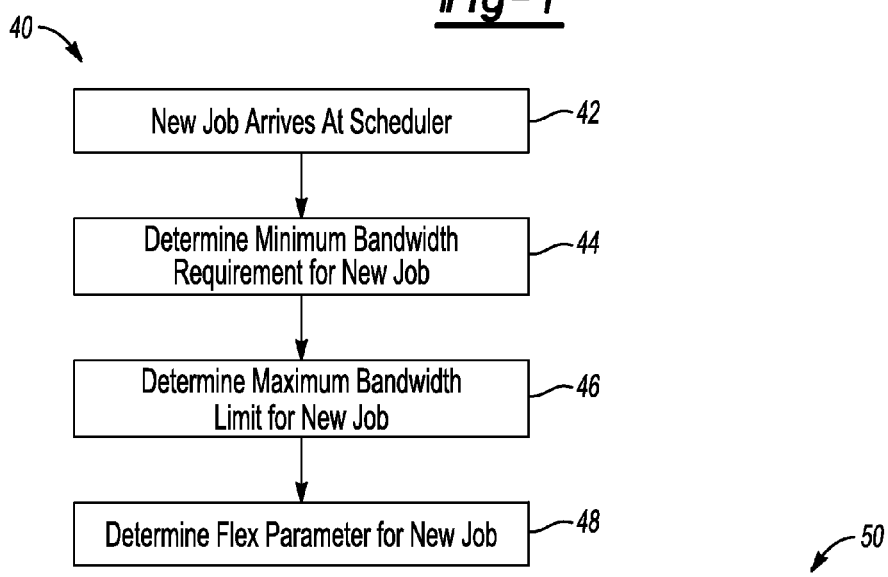
FIG. 2 is a flowchart diagram that summarizes an example data transfer management feature of an example embodiment.

The flowchart 40 of FIG. 2 summarizes an approach for determining the set of parameters used in an example embodiment. A new data transfer job arrives at one of the schedulers 24 or 28. For purposes of discussion, the scheduler 24 will be considered and the following applies equally to the scheduler 28. The scheduler 24 determines a minimum bandwidth requirement for the new job at 44. The scheduler 24 determines a maximum bandwidth limit for the job at 46.

At 48 the scheduler 24 determines a flex parameter for the data transfer job. The flex parameter specifies a maximum absolute variation in the rate (i.e., transfer rate in bits per second) for the job between successive data transfer periods (or epochs). For example, the difference between the rate for a first data transfer period and the rate for an adjacent data transfer period has to be less than or equal to the flex parameter. Given the minimum bandwidth requirement and the maximum bandwidth limit, the rate is also kept between those two values.

The minimum and maximum bandwidth depend on factors such as the type of job (e.g., data backup or database operations) and a data rate required by the servers involved to sustain the data transfer. The bandwidth limits may depend on, for example, flow and congestion window requirements. Those skilled in the art recognize the factors that have an influence on a minimum or maximum bandwidth required by a data transfer job.

For example, constant bit rate traffic will have equal values for the maximum and minimum and the flex parameter will have a zero value. A truly elastic job could theoretically have a minimum bandwidth requirement of zero, a maximum bandwidth limit of infinity and an infinite flex parameter. Jobs that should always take priority over less time-critical jobs may have a minimum bandwidth requirement that is greater than zero.

Jobs using TCP (transmission control protocol) will be limited by the flow and congestion windows and RTT (round trip time). The variation in rate for such jobs preferably would be gradual. One example includes setting the minimum and maximum bandwidth values appropriately to reflect the flow and congestion window requirements with a flex parameter that is not more than 10% of the maximum bandwidth.

As will be appreciated by those skilled in the art that have the benefit of this description, the three parameters (i.e., minimum bandwidth requirement, maximum bandwidth limit and flex parameter) allow for characterizing or categorizing nearly every type of practical flow requirement. The three parameters allow for a scheduling strategy that is superior to those that rely on a purely elastic traffic model. The three parameters also allow for a scheduling strategy that accommodates the differing needs of different traffic types.

The links between datacenters carry client traffic and CSP traffic or datacenter-to-datacenter traffic. The CSP traffic tends to be constant over the duration of a day and occupies as much as 40% of the link bandwidth between datacenters. Client traffic varies and is outside of the control of the CSP. Client traffic tends to follow the diurnal pattern mentioned above.

The different types of traffic have different urgencies. Client traffic has to be sent over the link as soon as it arrives. CSP traffic between datacenters, however, may be delay-tolerant especially when it includes jobs such as backup traffic, data base operations, video processing or analytics. Such jobs, while delay-tolerant, are typically very large and have to be completed within a reasonable amount of time. Such CSP traffic between datacenters can be referred to as bulk data traffic.

Apart from backup traffic, which could be considered somewhat elastic and pre-emptible within the maximum throughput, most of the bulk data workloads are not completely elastic jobs. Many such jobs, including video processing or analytics, for example, are constrained by the server resources at either end and can only be served at a specific rate. If more bandwidth were given to such inelastic jobs, they are not able to consume it. On the other hand, if less bandwidth is given to them, the server resources on either end will starve and operate at less than peak efficiency.

In a datacenter setting, the bandwidth that an instance can handle is governed by various events such as the virtual machines co-located in the same host, or connected to the same switch, or by the disk or memory bandwidth that is available to the instance. In such settings even jobs that are typically considered to be elastic, such as backup or data movement, tend to have a limit beyond which they cannot handle. For example, a FTP session cannot arbitrarily switch between periods of very high and zero bandwidth as this will clearly lead to timeouts and subsequent underutilization of the bandwidth and the virtual machine resource.

As conservation of bandwidth for cost reasons is a factor, it is useful to determine the minimum bandwidth required to ensure completion of all pending jobs in a timely manner. One feature of the disclosed example is keeping the overall capacity purchased by a CSP as low as possible. In some cases the purchased capacity is measured by one of several metrics, such as $95^{th}$ percentile or maximum capacity. Minimizing or reducing the capacity that must be purchased facilitates cost savings for the CSP. Scheduling involves accommodating various types of traffic. For example, some jobs are considered real time jobs with an unknown deadline. Real time jobs must be served right away. Each data transfer period or epoch may have some real time jobs. For discussion purposes the total bandwidth consumed by real time jobs in any epoch t is $Z(t)$. An estimate $x(t)$ of residual capacity is $x(t)=C(t)-Z(t)$, where $C(t)$ is the purchased link capacity for the epoch t. One example includes keeping the capacity arg max $C(t)$ as low as possible.

A set of jobs can be described by J and each job can be described by j. Each job j has a size $s_j$ bytes, an arrival time $a_j$ and a deadline $d_j$. Let $F_j=a_j+d_j$ and $T=\max_j F_j$ over all jobs j. Each job is assigned a rate $r(t)$ during the data transfer period or epoch t.

One example includes using the CSP's knowledge of the capacity that it is paying for in each completed epoch. The CSP also knows the bulk data jobs scheduled in the past measurement epochs and what bandwidth was consumed by them. Therefore, the CSP is able to determine the actual bandwidth consumed by the real time flows that are mostly client-driven. These factors allow for predicting residual capacity. In our example, each of these CSP determinations is made by the scheduler 24.

One example includes staying within four different design constraints on the scheduling algorithm for the scheduler. One constraint is that jobs have minimum and maximum rate guarantees with individual flex values. Another constraint is that only some jobs (or none) might be preempted at any time. There is also a potential error in relying on predicted bandwidth estimates. The fourth constraint in this example is the unpredictable nature of bulk data job arrivals in the future.

Several guidelines are used in one example. The first guideline is that non-pre-emptible jobs are scheduled first. A non-pre-emptible job for discussion purposes is one which cannot be given zero bandwidth in a current epoch (e.g., $r_j(t-1)$–flex parameter>0). The motivation for this guideline is to accommodate such jobs as soon as possible as they are the most constrained. Scheduling such jobs earlier maximizes flexibility in scheduling over time.

The next guideline is that all pending jobs are scheduled new in each epoch. All jobs are logically preempted at the end of every epoch and rescheduled as if they were jobs that just arrived at the scheduler 24. Particular attention is given to non-pre-emptible jobs by always scheduling them once they have been started regardless of the available bandwidth.

Another guideline in this example is to pack all jobs as early as possible. A bulk data job can arrive at the scheduler at any time in the future and it is best to use as much bandwidth as possible as early as possible, within the bounds of the currently available residual capacity. This guideline favors a greedy scheduling algorithm.

The last guideline for this example embodiment measures prediction errors to allow for some slack in the purchased bandwidth. If the predicted residual values are not accurate and are in fact less, then the peak bandwidth consumed by the real time and bulk data jobs will increase. If this trend were repeated over several epochs, which are not necessarily successive or immediately adjacent each other in time, it can cause an unbounded increase in the peak bandwidth charges for the CSP. Some slack bandwidth accounts for any such prediction errors. The amount of slack in one example is kept within a desired range because a large slack leads to bandwidth waste and not enough slack leads to the just-described increase in peak bandwidth charges. An example embodiment uses error measurement prediction to determine an optimal amount of slack.

Figure 3:
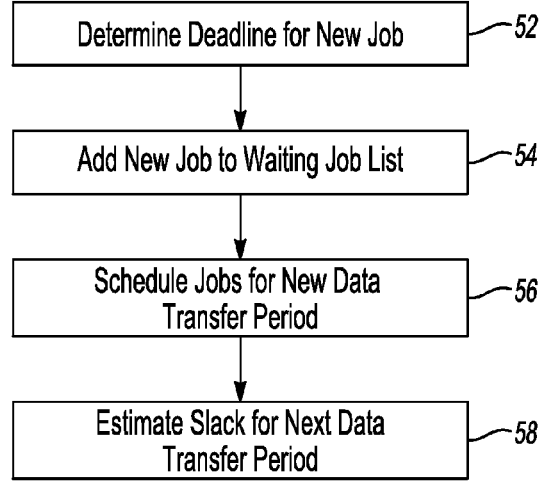
FIG. 3 is a flowchart diagram summarizing an example scheduling approach.

Having those guidelines in view, FIG. 3 includes a flowchart 50 that summarizes a scheduling approach of one example when a new job arrives. Table 1 includes pseudo code implementing the same approach according to one embodiment. The scheduling algorithm of Table 1 is a greedy residual scheduler (GRESE) algorithm that schedules jobs according to the guidelines described above and takes into account prediction errors. The steps summarized in FIG. 3 are performed by the scheduler 24 for each epoch.

TABLE 1

Function 1 GRESE(initLinkCapacity)

```
 1:  currentLinkCapacity = initLinkCapacity
 2:  linkIncrement = 1% of initLinkCapacity
 3:  waitingJobList = runningJobList = errorList = { } {empty}
 4:  for each time epoch t do
 5:      for each newly arrived job j do
 6:          compute a deadline for j
 7:          waitingJobList(t) += j
 8:          Rate in current epoch, r_j(t) = 0
 9:      end for
10:      while ScheduleJobs(0) == false do
11:          currentLinkCapacity += linkIncrement;
12:      end while
13:      ScheduleJobs(1)
14:      for each job j in runningJobList(t) do
15:          currentLinkCapacity −= allocatedCapacity
16:          j.size −= allocatedCapacity
17:          if j.size == 0 then
18:              runningJobList −= j
19:          end if
20:      end for
21:      SlackEstimator( )
22:  end for
```

In FIG. 3, the deadline for the new job is determined at 52 by the scheduler 24. The new job is added to a waiting jobs list at 54. The scheduler 24 schedules the jobs on the waiting jobs list for the next data transfer period or epoch at 56. Non-pre-emptible jobs that are already running are immediately scheduled. According to this example, the scheduler 24 verifies that all other waiting and running jobs can be scheduled in the residual capacity that is available (according to the current prediction). If there is insufficient link capacity an increment is added as described in Table 1. The scheduler 24 reduces the size of the jobs that ran for that epoch. The example of Table 1 and FIG. 3 includes updating the predication error and the estimated slack for the scheduled epoch at 58.

Figure 4:
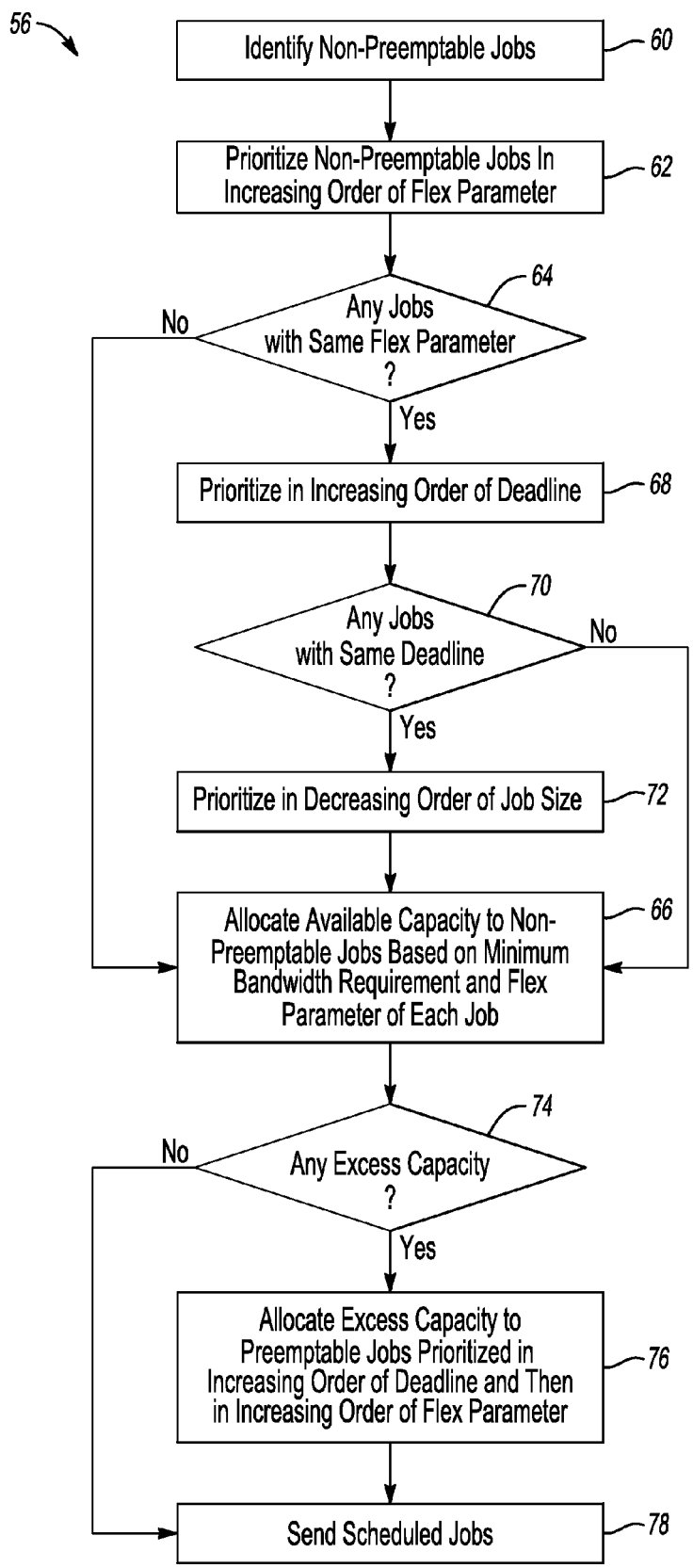
FIG. 4 is a flowchart diagram summarizing an example technique for scheduling jobs in a next data transfer period.

FIG. 4 includes a flowchart diagram providing more detail regarding the scheduling step 56 of FIG. 3. Table 2 contains pseudo code that is used in one embodiment for the scheduling of step 56.

TABLE 2

Function 2 ScheduleJobs(flag)

```
 1:  schedList = jobs with r_j(t − 1) > Δ_j, sorted in increasing order
     of their flex, Δ_j; tie is broken by increasing order of Deadline,
     and further ties are broken by decreasing order of remaining job
     size
 2:  otherJobList = {Remaining jobs in the system sorted in the
     increasing order of their deadline, tie is broken in the increasing
     order of flex}
 3:  schedList ← append otherJobList to end of schedList
 4:  x = current residual capacity
 5:  for each job j in schedList do
 6:      r_j(t) = FindMinBWneeded(j)
 7:      if (r_j(t) == −1 ) OR (r_j(t) > x) then
 8:          return false
 9:      else
10:          Allocate rate r_j(t) to job j in this epoch
```

TABLE 2-continued

Function 2 ScheduleJobs(flag)

```
11:          x = x − r_j(t)
12:          if flag == 1 then
13:              runningJobList(t) +=j
14:          end if
15:      end if
16:  end for
17:  if flag == 1 then
18:      AllocateExcessCapacity(x)
19:  end if
20:  return true
```

The process described in Table 2 and summarized in FIG. 4 begins with identifying non-pre-emptible jobs at 60. The scheduler 24 prioritizes the non-pre-emptible jobs in increasing order of flex parameter at 62. Starting with jobs having a lower or smaller flex parameter value helps to ensure that those jobs with less flexibility can be scheduled. At 64, the scheduler determines whether any of the jobs sorted at 62 has the same flex parameter as another job (or the respective flex parameter values are effectively indistinguishable based on a granularity selected for the sorting at 62). If not, then all the sorted jobs are in order of priority and the scheduler 24 proceeds to the step at 66 where the available capacity is allocated to the non-pre-emptible jobs.

If there are at least two jobs with the same flex parameter at 64, the illustrated example includes prioritizing any such jobs in increasing order of deadline at 68. Prioritizing the jobs with sooner deadlines helps to ensure that desired job completion occurs on time. At 70, the scheduler 24 determines if there are any jobs considered at 68 with the same deadline. If so, the scheduler prioritizes those jobs in decreasing order of job size so that larger jobs are scheduled with higher priority than smaller jobs (with the same deadline and the same flex parameter). All of the non-pre-emptible jobs are scheduled in an iterative manner for the next epoch at 66. If necessary, the available capacity C(t) is incremented as shown in Table 1. C(t) is a, non-decreasing function in this example since once capacity is purchased, the CSP might as well use it until the billing cycle is complete.

Allocating the available capacity at 66 involves determining whether the job is feasible based on its minimum bandwidth requirement and the amount of capacity available for that job. The flex parameter is also considered in this regard. Table 3 includes pseudo code that describes an approach according to one example.

TABLE 3

Function 3 FindMinBWneeded(Job j)

```
 1:  r_j(t − 1) = bandwidth assigned to j in preview epoch
 2:  F_j = Time by which job j should be complete
 3:  s_j^t = Remaining size of job j
 4:  t = current time
 5:  B_j(t) = max(B_j^{min}, r_j(t − 1) − Δ_j)
 6:  δ_j = B_j^{min} − B_j(t)
 7:  while δ_j <= Δ_j do
 8:      // Schedulability check for job j
 9:      if Σ_{i=t}^{F_j} min(B_j^{max}, r_j(t − 1) +δ_j+Δ_j.(F_j−i)) < s_j^t then
10:          // Job j cannot complete by its deadline
11:          δ_j = δ_j + e
12:      end if
13:  end while
14:  if δ_j > Δ_j then
15:      return −1
16:  else
17:      return (r_j(t − 1) + δ_j)
18:  end if
```

As can be appreciated from Table 3, determining whether the available capacity can accommodate the needed bandwidth for a currently considered job includes considering the rate of that job in the previous epoch, the time by which the job should be completed, the remaining size of the job, the current time and the bandwidth needed for the next epoch $B_j(t)$, which is the maximum of (i) the minimum bandwidth requirement and (ii) a difference between the rate of the previous epoch and the flex parameter for that job. Provided that a difference between the minimum bandwidth requirement and $B_j(t)$ is less than or equal to the flex parameter, then a determination is made if the job can be completed by its deadline. If not, then the capacity has to be incremented. If so, the job is scheduled for the next epoch at a rate assigned by the scheduler 24.

As shown in Table 2, the scheduler function of the scheduler 24 returns a true value if there is sufficient link capacity to finish all the jobs before their respective deadlines. Otherwise the scheduler 24 returns a false value.

As shown in FIG. 4, the scheduler 24 determines at 74 whether there is any excess residual capacity. If not, then bulk data or pre-emptible jobs are not scheduled in that epoch. Scheduling non-pre-emptible jobs first in this example facilitates serving real time and critical flows during peak hours in which more bandwidth is consumed. Delaying the scheduling of pre-emptible jobs allows for using up bandwidth that is available during off-peak times for such jobs.

If there is residual excess capacity, then the pre-emptible jobs from the other job list of Table 2 are scheduled at 76. In this example, those jobs are prioritized in increasing order of deadline so that jobs that must finish earlier are scheduled ahead of others with later deadlines. If any of the jobs have the same deadline (or deadlines that are so close that they are effectively indistinguishable for the prioritization at 76) then such jobs are prioritized in increasing order of flex parameter. This accommodates jobs that have less flexibility ahead of others so that the less flexible jobs will be scheduled as soon as possible to protect against such a job not fitting within potentially less-favorable link capacity conditions at a later time. Table 4 contains pseudo code that explains an example technique of allocating residual excess capacity.

TABLE 4

Function 4 AllocateExcessCapacity(Capacity x)

```
1:   sortedJobList = {jobs in runningJobList sorted in the increasing
     order of deadlines and break ties by deceasing order of flex}
2:   τ = length of epoch
3:   for each job j in sortedJobList do
4:     if x > 0 then
5:       r_j(t) = bandwidth assigned to j in current epoch
6:       s_j^t = Remaining size of job j
7:       if τr_j(t) >= s_j^t then
8:         e_j = min(r_j(t) + Δ_j, s_j^t/τ, x)
9:         r_j(t)+ = e_j
10:        x = x - e_j
11:      end if
12:    end if
13:  end for
```

All of jobs that have been scheduled for the next data transfer period or epoch are sent at 78 over the link 30 (FIG. 1).

As mentioned above, the disclosed example includes providing slack to accommodate errors in the estimation of available capacity. Table 5 includes pseudo code for one example approach at estimating a suitable amount of slack.

TABLE 5

Function 5 SlackEstimator( )

```
1: error = actualCapacityOfRTJobs − predictedCapacityOfRTJobs
2: errorlist += error
3: use error to update currentLinkCapacity for next epoch
4: slack = 95th percentile of errorList
```

This example slack estimation determines a current prediction error and adds it to a list of prediction errors over a selected time. In one example, the scheduler 24 maintains a list of the prediction errors for the previous 30 days. The slack for a next scheduled epoch is set to a selected percentile of the error. In the example of Table 5, the slack is set to be equal to the $95^{th}$ percentile of the error. The scheduler 24 updates the prediction for the next epoch based on a running average of the errors in the maintained list. In one example, the running average is heavily weighted toward the error of the current epoch. Determining slack and error estimation in this manner facilitates improved efficiencies and economies of bandwidth usage for a CSP.

According to one example embodiment, if a value smaller than the $95^{th}$ percentile were used that leads to a significant increase in peak bandwidth consumed for data transfer. The slack capacity estimation of the described example protects against a run up of the peak capacity consumption.

One feature of the example embodiment is that it facilitates completing bulk data or pre-emptible jobs early. Completing jobs as early as possible keeps the link available to schedule any future unexpected traffic spikes. In one example implementation, more than half and as many as 80% of the elastic jobs finish significantly in advance of their deadlines. In one example, all of the jobs are completed with more than 20% of the time remaining before their deadlines.

Another feature of the example embodiment is that it reduces peak bandwidth use. One example provides about 30% reduction in peak link utilization. Depending on the rate that a CSP pays for peak link utilization, such a reduction can provide a significant cost savings. When the disclosed approach is used over several high capacity links, such savings can be dramatic.

The disclosed example is useful in, but not necessarily limited to, a cloud service scenario in which a CSP pays for link capacity usage to complete bulk data transfer jobs between datacenter devices. As cloud services become more popular the number of datacenters, the amount of data stored in the cloud and frequent use of geographic replication increases. The disclosed data transfer management approach reduces the peak bandwidth consumed by scheduling bulk data jobs or flows that can be delayed during off-peak hours and uses peak hour bandwidth mainly for serving real time or critical data flows. The savings that are made possible by this approach are significant.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A data transfer manager for managing data transfer from a datacenter configured to communicate over at least one link, comprising:

a scheduler device comprising at least one processor, the scheduler device being configured to schedule a plurality of jobs for communicating data from the datacenter, the scheduler device,
determines a minimum bandwidth requirement of the plurality of jobs, respectively,
determines a maximum bandwidth limit of the plurality of jobs, respectively, and
determines a flex parameter of the plurality of jobs, respectively, the flex parameter indicates how much allocated bandwidth can vary between adjacent data transfer periods for the respective one of the plurality of jobs;
wherein
the scheduler device assigns a deadline to the plurality of jobs, respectively, the assigned deadlines respectively indicating whether there can be any delay in communicating the data of the respective one of the plurality of jobs over the at least one link;
a non-pre-emptible job is a job that has to be allocated at least some bandwidth in a next scheduled data transfer period;
a pre-emptible job is a job that can go without any allocated bandwidth in the next scheduled data transfer period; and
the scheduler schedules the plurality of jobs in the next scheduled data transfer period by
giving priority to any non-re-emptible jobs of the plurality of jobs over any pre-emptible jobs of the plurality of jobs, and
giving priority among non-pre-emptible jobs of the plurality of jobs in an increasing order of flex parameter then in an increasing order of assigned deadline for jobs having the same flex parameter and then in a decreasing order of job size for jobs having the same flex parameter and the same assigned deadline.

2. The data transfer manager of claim 1, wherein the scheduler schedules any pre-emptible jobs of the plurality of jobs by giving priority among the pre-emptible jobs in increasing order of the deadline and in increasing order of the flex parameter for jobs having the same deadline.

3. The data transfer manager of claim 2, wherein
the scheduler determines whether there is excess capacity available after the non-pre-emptible jobs have been scheduled; and
the scheduler schedules any pre-emptible jobs in the next scheduled data transfer period if there is excess capacity.

4. The data transfer manager of claim 1, wherein
the scheduler determines whether an available capacity during the next data transfer period is sufficient to schedule all of the non-pre-emptible jobs; and
the scheduler increases an amount of capacity if the available capacity is insufficient to schedule all of the non-pre-emptible jobs.

5. The data transfer manager of claim 1, wherein
the scheduler determines an estimated capacity required for non-pre-emptible jobs of the plurality of jobs for each scheduled data transfer period;
the scheduler determines an actual capacity used by non-pre-emptible jobs in each data transfer period;
the scheduler determines a prediction error based on a difference between the estimated capacity and the actual capacity for each data transfer period; and
the scheduler reserves an amount of capacity slack for a next scheduled data transfer period based on the prediction error.

6. The data transfer manager of claim 5, wherein
the scheduler maintains a list of prediction errors over a selected time; and
the scheduler determines the amount of capacity slack for the next scheduled data transfer period based on a selected percentile of the list of prediction errors.

7. The data transfer manager of claim 5, wherein
the scheduler determines an average of prediction errors over a selected time; and
the scheduler determines the estimated capacity based on the average.

8. The data transfer manager of claim 7, wherein the scheduler determines the average as a weighted average wherein the most recent prediction error is more heavily weighted than older prediction errors.

9. A method of managing data transfer from a datacenter configured to communicate over at least one link, comprising using a scheduler comprising at least one processor for:
determining a minimum bandwidth requirement of a plurality of jobs, respectively,
determining a maximum bandwidth limit of the plurality of jobs, respectively, and
determining a flex parameter of the plurality of jobs, respectively, the flex parameter indicates how much allocated bandwidth can vary between adjacent data transfer periods for the respective one of the plurality of jobs;
assigning a deadline to the plurality of jobs, respectively, the assigned deadlines respectively indicating whether there can be any delay in communicating the data of the respective one of the plurality of jobs over the at least one link;
wherein
a non-pre-emptible job is a job that has to be allocated at least some bandwidth in a next scheduled data transfer period;
a pre-emptible job is a job that can go without any allocated bandwidth in the next scheduled data transfer period; and
the method comprises scheduling the plurality of jobs in the next scheduled data transfer period by
giving priority to any non-re-emptible jobs of the plurality of jobs over any pre-emptible jobs of the plurality of jobs, and
giving priority among non-pre-emptible jobs of the plurality of jobs in an increasing order of flex parameter then in an increasing order of assigned deadline for jobs having the same flex parameter and then in a decreasing order of job size for jobs having the same flex parameter and the same assigned deadline.

10. The method of claim 9, comprising scheduling any pre-emptible jobs of the plurality of jobs by giving priority among the pre-emptible jobs in increasing order of the deadline and in increasing order of the flex parameter for jobs having the same deadline.

11. The method of claim 10, comprising
determining whether there is excess capacity available after the non-pre-emptible jobs have been scheduled; and
scheduling any pre-emptible jobs in the next scheduled data transfer period if there is excess capacity.

12. The method of claim 9, comprising
determining whether an available capacity during the next data transfer period is sufficient to schedule all of the non-pre-emptible jobs; and
increasing an amount of capacity if the available capacity is insufficient to schedule all of the non-pre-emptible jobs.

13. The method of claim 9, comprising
determining an estimated capacity required for non-pre-emptible jobs of the plurality of jobs for each scheduled data transfer period;
determining an actual capacity used by non-pre-emptible jobs in each data transfer period;
determining a prediction error based on a difference between the estimated capacity and the actual capacity for each data transfer period; and
reserving an amount of capacity slack for a next scheduled data transfer period based on the prediction error.

14. The method of claim 13, comprising
maintaining a list of prediction errors over a selected time; and
determining the amount of capacity slack for the next scheduled data transfer period based on a selected percentile of the list of prediction errors.

15. The method of claim 13, comprising
determining an average of prediction errors over a selected time; and
determining the estimated capacity based on the average.

16. The method of claim 15, comprising determining the average as a weighted average wherein the most recent prediction error is more heavily weighted than older prediction errors.

* * * * *